(12) United States Patent
Bello et al.

(10) Patent No.: US 8,931,076 B2
(45) Date of Patent: Jan. 6, 2015

(54) SECURE ROUTE DISCOVERY NODE AND POLICING MECHANISM

(71) Applicant: International Business Machines Corporation, Armonk, NY (US)

(72) Inventors: Adekunle Bello, Austin, TX (US); Radhika Chirra, Austin, TX (US); Venkat Venkatsubra, Austin, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/865,492

(22) Filed: Apr. 18, 2013

(65) Prior Publication Data

US 2013/0232559 A1    Sep. 5, 2013

Related U.S. Application Data

(63) Continuation of application No. 12/558,744, filed on Sep. 14, 2009, now abandoned.

(51) Int. Cl.
*H04L 29/06* (2006.01)
*H04L 12/717* (2013.01)

(52) U.S. Cl.
CPC .............. *H04L 63/04* (2013.01); *H04L 63/08* (2013.01); *H04L 63/105* (2013.01); *H04L 45/42* (2013.01)
USPC ............................................. 726/14; 726/13

(58) Field of Classification Search
CPC ....... H04L 63/08; H04L 63/04; H04L 63/105; H04L 45/42
USPC .......... 726/4, 13, 14; 709/244, 225, 237, 238; 713/153, 166
See application file for complete search history.

(56) References Cited

U.S. PATENT DOCUMENTS

| | | | |
|---|---|---|---|
| 5,369,707 A | 11/1994 | Follendore, III |
| 5,781,550 A | 7/1998 | Templin et al. |
| 6,108,787 A | 8/2000 | Anderson et al. |
| 6,304,973 B1 | 10/2001 | Williams |
| 6,510,464 B1 | 1/2003 | Grantges, Jr. et al. |
| 7,143,290 B1 | 11/2006 | Ginter et al. |
| 7,343,421 B1 | 3/2008 | Goyal |
| 7,343,622 B1 | 3/2008 | Woodall |

(Continued)

OTHER PUBLICATIONS

Li, Hongwei; Mosar: A Secure On-Demand Routing Protocol for Mobile Multilevel Ad Hoc Networks; Dept. of Computer Eng.; NJ Institute of Tech.;Aug. 25, 2007.

(Continued)

*Primary Examiner* — Chau Le
(74) *Attorney, Agent, or Firm* — Parashos T. Kalaitzis; Robert C. Rolnik

(57) ABSTRACT

A computer implemented method for obtaining a secure route. A trusted host sets a node security association for a trusted host. The trusted host receives, at the trusted host, a client communication request directed to a destination host. The trusted host builds a secure route query comprising a trusted host address, a destination host address, and at least one security level, to form at least one secure route. The trusted host sends packets from the trusted host to the destination host based on the at least one secure route. The packets are responsive to the client communication request, and the packets each have a security label that matches the security level.

1 Claim, 6 Drawing Sheets

(56) References Cited

U.S. PATENT DOCUMENTS

| | | |
|---|---|---|
| 7,360,210 B1 | 4/2008 | Vacanti et al. |
| 2003/0014665 A1 | 1/2003 | Anderson et al. |
| 2004/0015689 A1 | 1/2004 | Billhartz |
| 2005/0198250 A1 | 9/2005 | Wang |
| 2006/0015943 A1 | 1/2006 | Mahieu |
| 2007/0157307 A1 | 7/2007 | Katoh et al. |
| 2007/0226493 A1 | 9/2007 | O'Brien et al. |
| 2009/0141651 A1* | 6/2009 | White et al. .................. 370/254 |

OTHER PUBLICATIONS

Manning, et al; Secure Application Routing; U.S. Appl. No. 12/181,452; USPTO.

Le, Chau D; Office Action; Jun. 3, 2011; U.S. Appl. No. 12/181,452; USPTO.

Chau Le; Office Action; U.S. Appl. No. 13/865,427; Jul. 7, 2014; USPTO.

* cited by examiner

SECURE ROUTE DISCOVERY NODE AND POLICING MECHANISM

The present invention relates generally to a computer implemented method for network security. More specifically, the present invention relates to segregating network traffic to traverse only secure routers that have clearance levels at least has high as the classification of the network traffic itself.

Government data processing systems are routinely used to process information under a security scheme that governs the circulation of information within and among people, secure areas or places, and machines. A typical security scheme stratifies security levels as being, for example, unclassified, classified, secret, and top secret. A security level is a generic term for either a clearance level or a classification level.

A clearance level indicates the level of trust given to a person, computer node, or place. The clearance level indicates the highest level of classified information to be stored or handled by the person device or location. A classification level indicates the level of sensitivity associated with some information, such as in a document or a computer file. The level is supposed to indicate the degree of damage the country could suffer if the information is disclosed to an enemy. A high level, such as "top secret" is information that potentially could seriously damage a country. Though this label is somewhat subjective, information labeled "top secret" has a higher security level than "secret". Similarly, "secret" has a higher security level than "classified". In addition, "classified" has a higher security level than "unclassified". Similar security levels may exist in countries other than the United States of America, and may have more or less labels. However, the security scheme is organized, the people, places, and equipment with higher clearance levels are permitted to access information classified at the corresponding classification level or lower. Thus, a "top secret" person may access information in the levels below that label, for example "classified".

Access by machines or people of information classified above the clearance level of the machine or person is placing such information at risk in entities that are not trained, equipped, or trusted sufficiently to assure continued security of such information. Accordingly, governments seek ways to detect when such occurrences happen to data owned and controlled by the government. In essence, part of the job of a government is to locate leaks or potential leaks and issue warnings, legal action, training, etc., to abate further dissemination of information in improper ways.

FIG. 3 is a model of data regulation in a stratified security classification system. In a network of computers, a government may regulate the flow of data according to the model shown in FIG. 3. Each computer may also be called a node, host, or router. FIG. 3 shows how information, such as documents, flows with respect to a hypothetical process. "Cat" document 301 is classified "top secret" 305; "dog" document 311 is classified "secret"; and "bird" document 321 is classified "unclassified" 325. In relation to these documents, a word processor process 331 has varying levels of access. Word processor process 331 is a client executing on a node. A client is a process that executes on a node.

Word processor process 331 is cleared to a "secret" security level. A label "secret" 335 is set to correspond with the process in the node. Accordingly, word processor process 331 can read from the unclassified "bird" document 325. In addition, word processor process 331 can both read 353 and write 355 to secret "dog" document 311. Importantly, it is undesirable, to the government who protects information, that word processor process 331 reads documents such as top secret labeled "cat" document 301. In other words, the process is forbidden from "reading up" a classification level from the clearance level associated with the process. Reading up means that a process, person, or device has obtained or read data that is above the clearance level of the process, person, or device. A government can take steps to stop reading up, though it may have to contend with reading up occurring, despite the government's efforts.

The above conditions are addressed in the following detailed description.

BRIEF SUMMARY

The present invention provides a computer implemented method for obtaining a secure route. A trusted host sets a node security association for a trusted host. The trusted host receives, at the trusted host, a client communication request directed to a destination host. The trusted host builds a secure route query comprising a trusted host address, a destination host address, and at least one security level, to form at least one secure route. The trusted host sends packets from the trusted host to the destination host based on the at least one secure route. The packets are responsive to the client communication request, and the packets each have a security label that matches the security level.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
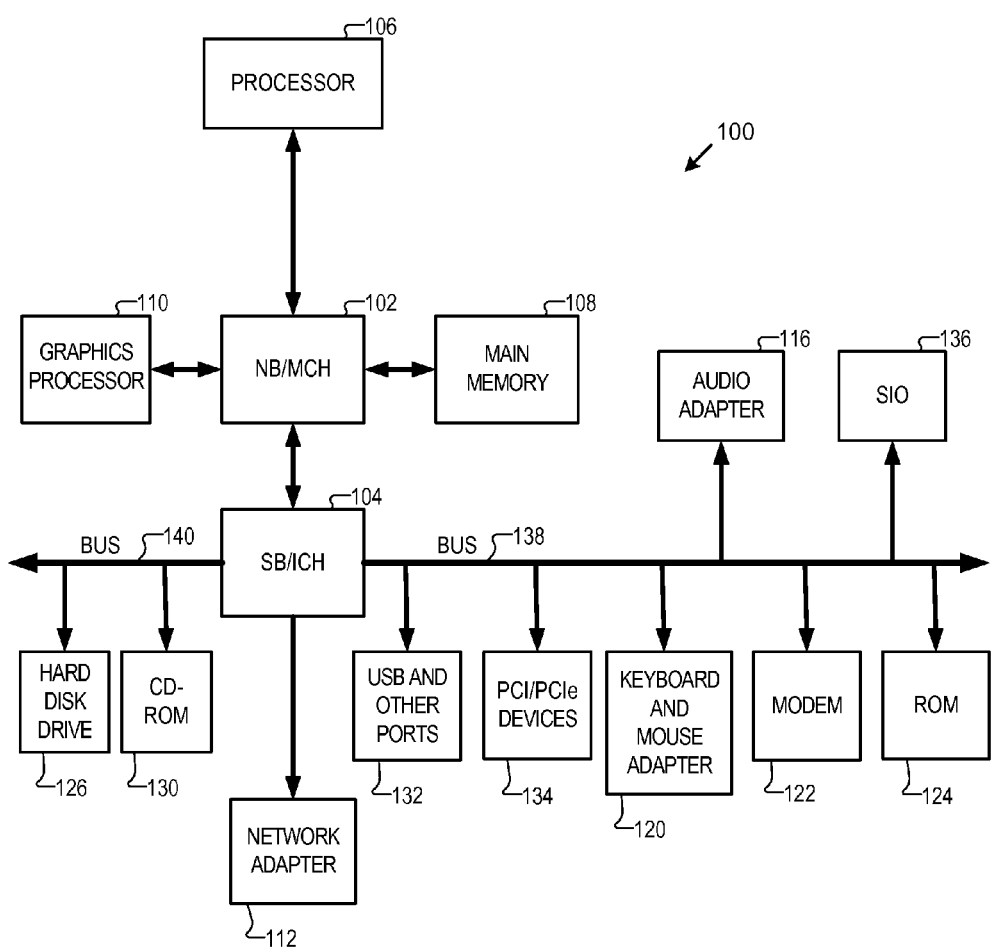
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, and the practical application, and to enable others of ordinary skill in the art to understand the invention for various embodiments with various modifications as are suited to the particular use contemplated.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for establishing a secure path between a trusted host and a destination host, or at least indicating to a destination host that a secure route is unknown to a secure route discovery node. In other words, in the second situation, there is no secure route available to the secure discovery node that will satisfy a classification level of data targeting the destination host.

Figure 2:
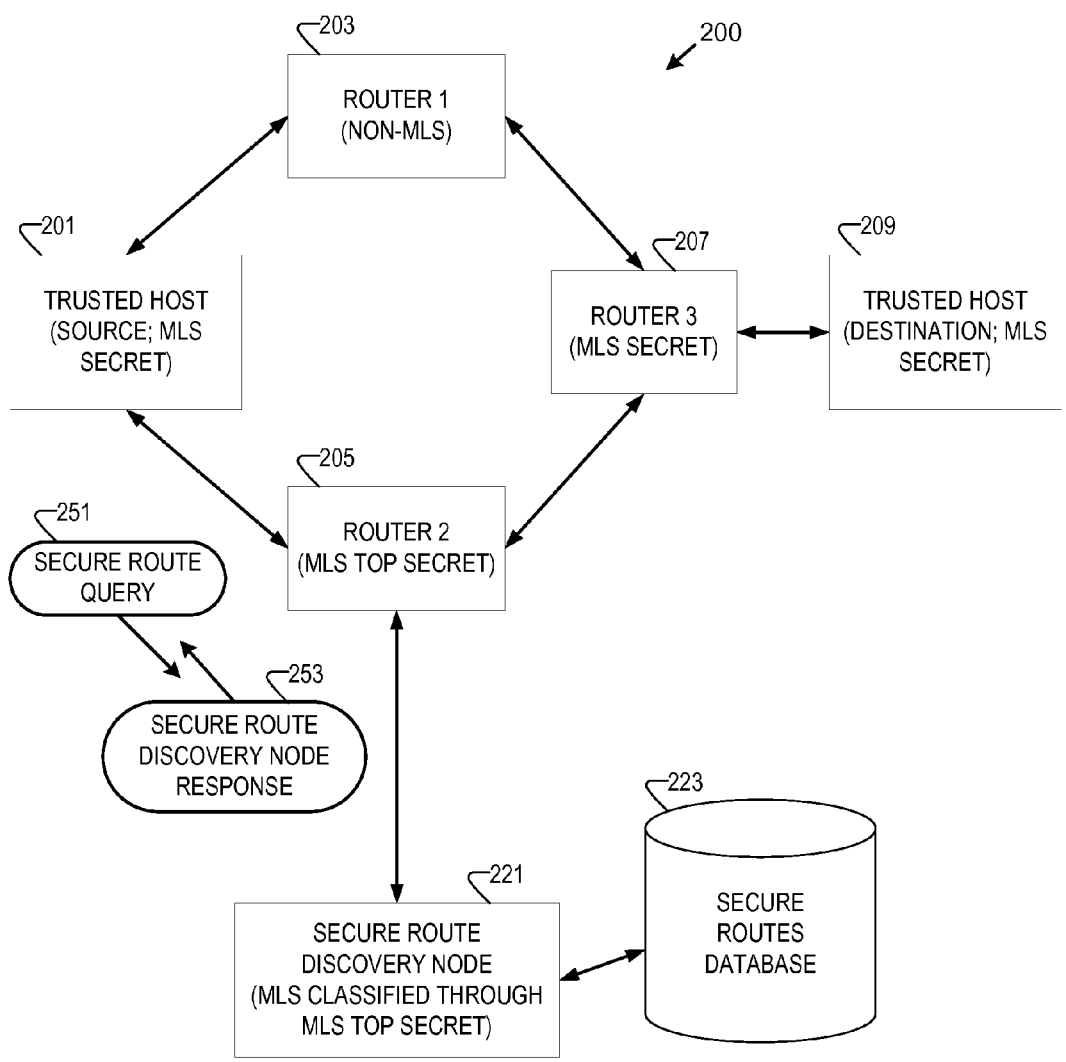
FIG. 2 shows a heterogeneous network of multilevel security routers and non-multilevel security routers.
Figure 3:
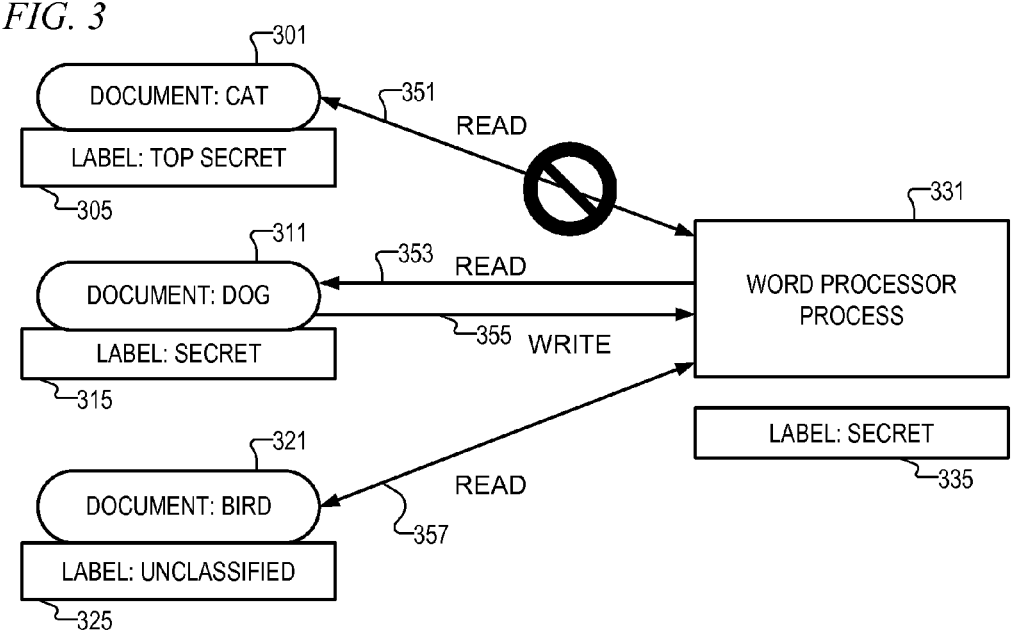
FIG. 3 is a model of data regulation in a stratified security classification system.

FIG. 2 shows a heterogeneous network of multilevel security routers and non-multilevel security routers, in accordance with an illustrative embodiment of the invention. A secure router is a router that has a corresponding clearance level set by an administrator who has authority from a government. A secure router can be a multilevel security (MLS) router. A multilevel security router is a router that meets standards set forth in RFC 1038, 1108 as well as and other standards that generally describe internet security options, such as, Revised Internet Protocol Security Option (RIPSO) and Commercial Internet Protocol Security Option (CIPSO). Conversely, the non-multilevel security (non-MLS) router does not take any responsive routing action based on any label, although it may drop a packet that carries a label. A trusted host 201 is connected by a network in a manner that may permit unclassified data to pass over several intermediate routers or nodes. These routers include non-MLS router 1 203, MLS top secret router 2 205, and MLS secret router 3 207. MLS secret router 3 207 controls traffic entering and leaving a destination host. The destination host is a target to which an initiator of communication, for example trusted host 201, directs communication. In other words, a client communication request (explained below with reference to FIG. 8) describes which trusted host is to be targeted for communication. The destination host may be trusted host 209. Both trusted host 201 and trusted host 209 have "secret" clearance levels associated with each of them. Each of trusted host 201, non-MLS router 1 203, MLS top secret router 2 205, and MLS secret router 3 207, trusted host 209, and secure route discovery node 221 may be organized in the same manner as data processing system 100 of FIG. 1. For purposes of the examples shown below, trusted host 201 operates as a source, while trusted host 209 operates as a destination for an ad hoc communication. It is appreciated that the roles may be changed in accordance with which trusted host initiates a communication at a given time.

Network 200 is monitored and served by secure route discovery node 221. A secure route discovery node is a node that collects the network topology information of a network. Accordingly, a secure route discovery node may record to a database each router in the network topology and a clearance level. The database that stores each paring of a router and clearance level is a secure routes database controlled by the secure route discovery node. Secure route discovery node 221 updates and queries secure routes database 223 in response to activity on network 200.

Activity on the network may appear in at least three different forms. First, the network may query the secure route discovery node by transmitting to the secure route discovery node secure route query 251. Second, the network's routers may each transmit a multicast packet or packets (not shown) in order to announce the connectivity or clearance level status of the sending router. Third, a secure router may collect and report anomalous packet sources. In other words, the secure router may identify routers that send packets that reach a secure router having a clearance level below the security label of such packets. A security label is an indication of the classification level of information transmitted over a network. In addition, and in response to node secure route queries, the secure route discovery node may respond with a secure route discovery node response 253. Each of these communications or activities are described further below.

Figure 4:
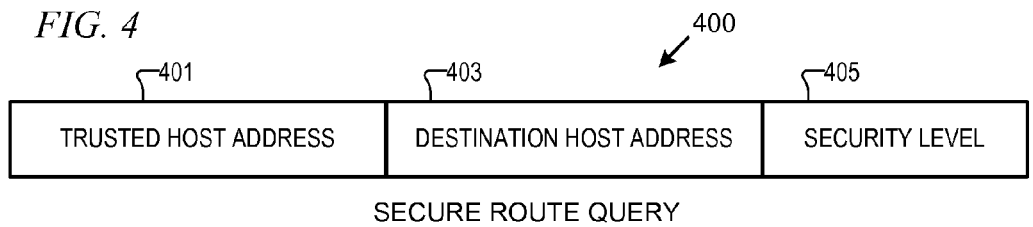
FIG. 4 is a secure route query in accordance with an illustrative embodiment of the invention.

FIG. 4 is a secure route query in accordance with an illustrative embodiment of the invention. A secure route query may be built in a trusted host or be transported in one or more packets as a payload. A secure route query is a message sent by a trusted host to a secure route discovery node. A secure route query may have three forms of data, namely, a trusted host address, a destination host address, and a security level. In this example, secure route query 400 is depicted as trusted host address 401, destination host address 403, and security level 405. A trusted host address is an address that, with respect to the network, uniquely identifies the trusted host. A security level, within the secure route query, is the security level desired for communicating packets. The security level may be a level selected by client, or may be a level that, by default, all applications use.

A secure route discovery node may respond to a security route query with a secure route. If the secure route is found and sent to the trusted host, the trusted host may cache the route (along with other routes) in a manner to track the security level associated with the route. The security level associated with the route may be the lowest security level of any security router along the route. The trusted host may store the secure route to a secure route cache. A secure route cache is a low-latency recording device local to a trusted host. By 'local to' it is meant that the recording device is housed within a data processing system that is the trusted host, or is within a common structure having security features consistent with the clearance level of the trusted host. The recording device can be, for example, main memory 108, hard disk drive 126, cache within processor 106, or any other device capable of storing data.

Figure 5:
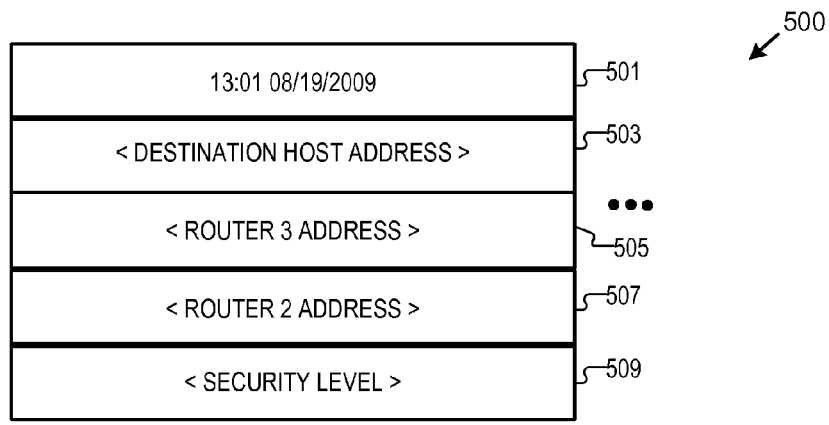
FIG. 5 is an example secure route cache in accordance with an illustrative embodiment of the invention.

FIG. 5 is an example secure route cache in accordance with an illustrative embodiment of the invention. Secure route cache 500 can include cache time expiration 501. A cache time expiration is a time that is set by an administrator to reset the cache by resuming an untrusted and/or unverified state with respect to the particular path to which the cache time expiration is associated. In the example of FIG. 5, the cache time expiration is 13:01 Aug. 19, 2009. The cache time expiration may include indications of time zone, daylight savings status, and be expressed according to any calendar or epoch that is a convention for marking time by the government. The secure route cache may also include a destination host address 503, as well as zero or more intermediate secure routers. In this case, the intermediate secure routers include secure router 3's address 503, and secure router 2's address 505, while the destination host address may reference trusted host 209. In addition, the secure route cache may include security level 509 assigned to the route. The cache time expiration, intermediate routers, and security level may be added together or deleted together from the secure route cache. Multiple routes may be present in the secure route cache. An intermediate router is a router located along a route, but not at the endpoints of the route.

Figure 6:
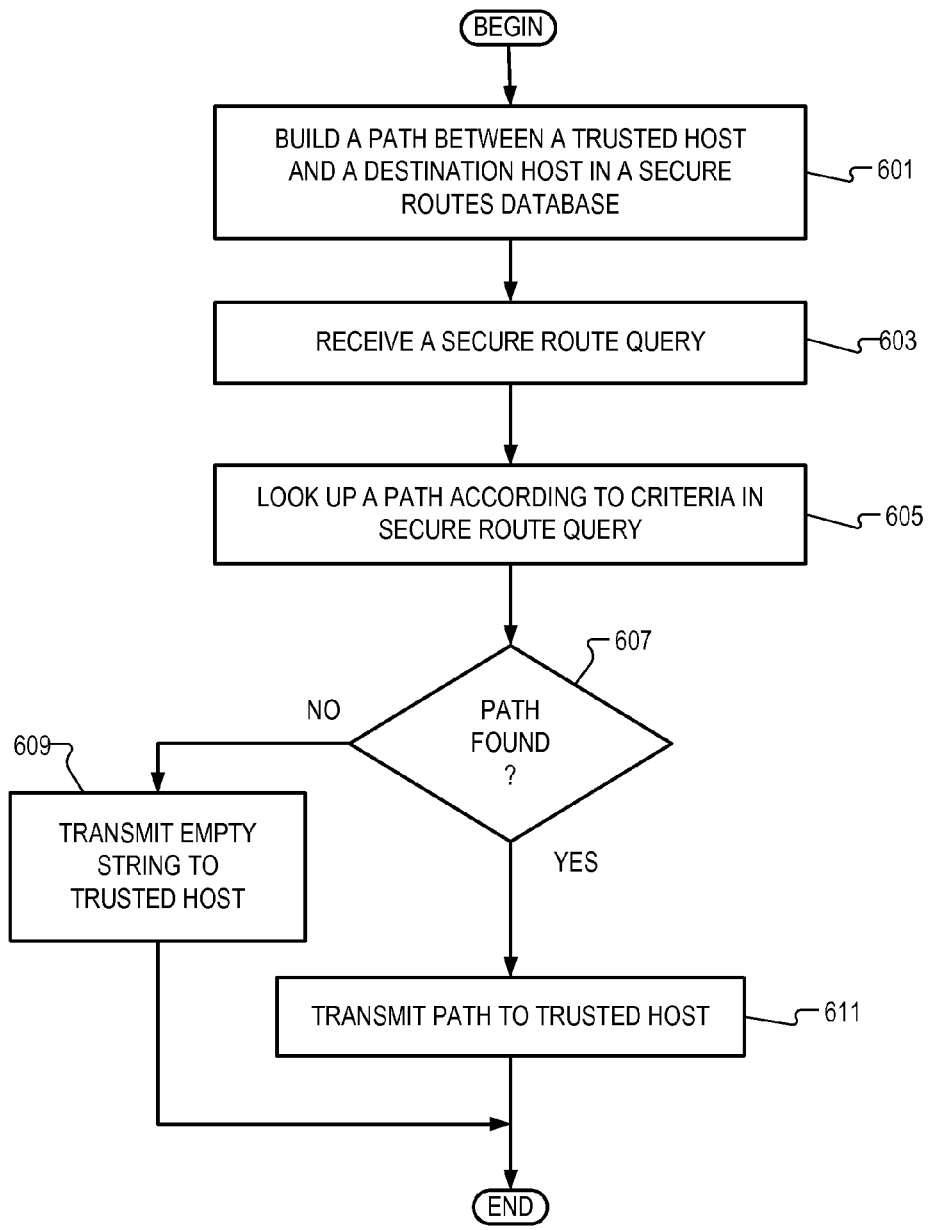
FIG. 6 is a flowchart of steps to configure a secure route discovery node and respond to a secure route query in accordance with an illustrative embodiment of the invention.

FIG. 6 is a flowchart of steps to configure a secure route discovery node and respond to a secure route query in accordance with an illustrative embodiment of the invention. Initially, the secure route discovery node may build a path between a trusted host and a destination host in a secure routes database (step 601). The trusted host may be, for example, trusted host 201, while the destination host may be trusted host 209. In this arrangement, trusted host 201 may be a source destination host. In other words, the trusted host plays the role of a data processing system that originates the communication. At different times, either trusted host 201 or trusted host 209 may take the role of the source destination host. Any time that a trusted host originates a communication, that trusted host is a source trusted host. Accordingly, a source trusted host is a trusted host, that with respect to a communication, is the originating device for the communication in relation to a network.

Step 601 may be performed, for example, by an administrator entering a path describing each host, secure router or destination host by a unique descriptor into a secure routes database, together with a security level that the path, as a whole is able to support. By being able to support, it is meant that the security level of packets may traverse nodes in the path without the security level of the packets being above the clearance level of each node in the path. By being "above" it is meant that the first security level is one corresponding to more rigid and exclusive security precautions and/or value than a second security level corresponding to a lighter and/or more relaxed security precaution and/or value.

It is appreciated, that other ways of building a path may be performed at step 601. For example, a secure route discovery node may receive multicast packets originating from a secure router that describe the security level and the next hop routers to which it may communicate. The secure route discovery node may then use the information from such multicast packets and build a topology image that it can use to determine the secure routes between two given hosts and also the security levels on these routes. This topology image allows the secure route discovery node to learn about the available routers without significant direct involvement of an administrator.

Next, the secure route discovery node may receive a secure route query (step 603). The secure route query may be in the form, for example, of secure route query 400 of FIG. 4. Next, the secure route discovery node may look up a (secure) path according to criteria in the secure route query (step 605). For example, the secure route discovery node may receive a secure route query comprising a trusted host address corresponding to trusted host 201 of FIG. 2, as well as a destination host address corresponding to trusted host 209 of FIG. 2. A destination host address is an address, which with respect to the network, uniquely identifies the destination host.

The secure route query may further include a security level, for example, "secret". In the example of FIG. 2, there are two paths from trusted host 201 to destination host. The first path is the path defined by trusted host 201, router 1, router 3, and destination host. The second path is the path defined by trusted host 201, router 2, router 3, and destination host. Each path is paired to the security level of the lowest secure router along the path. The first path may correspond to security level "confidential", while the second path may correspond to "secret". Each path, together with its corresponding security level, is stored to the secure routes database. Thus, a criteria to meet when looking up a path, in this example is that each router in the path correspond to "secret" security level, otherwise, the route fails to meet the criteria. The criteria can be met if the current route examined by the secure route discovery node finds a path that has the same security level or above as compared to the security level of the secure route query. The criteria are one or more comparisons to the information in the secure route query to data stored in the secure routes database.

Next, the secure route discovery node may determine whether criteria are met. The criteria determination may influence which information the secure route discovery node transmits to a source trusted host. In other words, the secure route discovery node determines if a path is found (step 607). This determination is affirmative when at least one path is found. In which case, the secure route discovery node may transmit the path or paths to the trusted host (step 611). Again, in the context of this example, trusted host 611 plays the role of source trusted host. The secure route discovery node can transmit the paths as a secure route discovery node response. The secure route discovery node response can include each node along the path as well as the security level corresponding to the path, as looked up from the secure routes database. On the other hand, a negative determination may cause the secure route discovery node to transmit an empty string to the trusted host (step 609). In the case that the secure route discovery node performs step 609, the secure route discovery node transmits the empty string as at least a part of a secure route discovery node response. Processing may terminate after steps 609 or 611. An empty string may be null data stored in a payload of a packet sent from the secure route discovery node to the trusted host. As may be appreciated, the null data may be any suitable form of placeholder, for example, if a convention is to send paths to the trusted host as data that specifies a number of hops along a path as an initial value to the path (with respect to step 611), then a number of hops equal to zero may indicate an empty string.

A simplified case of looking up the path can be finding a network segment having one endpoint selected from a group consisting of trusted host and destination host. Such a network segment, to meet the criteria, can have a clearance level at least as high as the classification level of the secure route query such that the network segment and at least one additional network segments interconnect trusted host and destination host. Each additional network segment has endpoints each having a clearance level at least as high as the classification level of the secure route query.

One way to fail to look up a secure path is to locate only inadequate paths. An inadequate path is a path that corresponds to a clearance level below the security level of the secure route query. Such a path or paths may be found by step 605 when only one or more inadequate paths are found in response to receiving a secure route query.

Periodically, the secure route discovery node may receive multicast packets from a secure routers, as described further below with respect to FIG. 7. Such multicast packets contain information by which the secure route discovery node may obtain information concerning a secure router's clearance level and neighboring nodes. Accordingly, the secure route discovery node may populate its secure routes database with such information. It is appreciated that, from time to time, an administrator may override information stored in the secure routes database.

Figure 7:
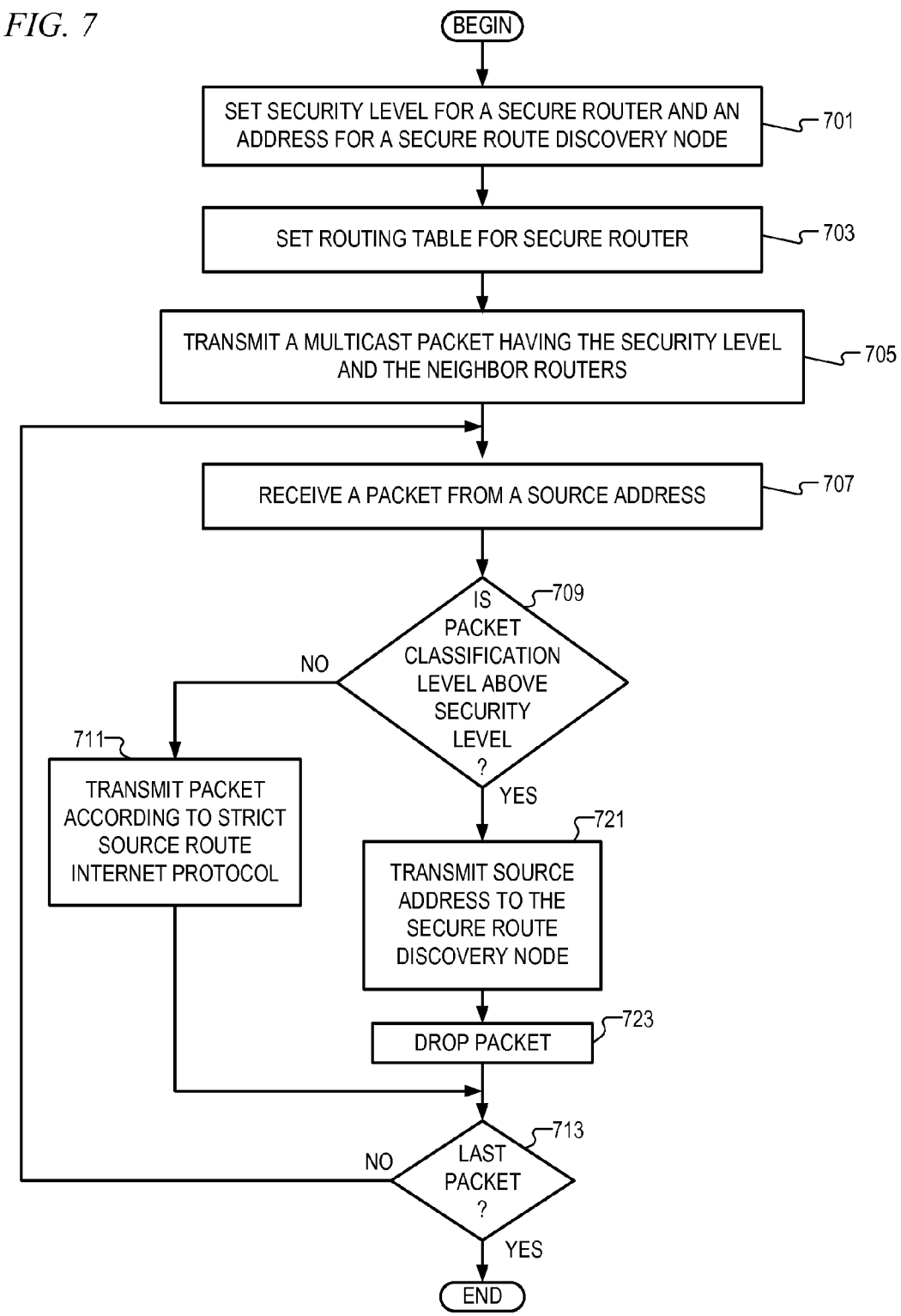
FIG. 7 is a flowchart of steps performed at a secure router in accordance with an illustrative embodiment of the invention.

FIG. 7 is a flowchart of steps performed at a secure router in accordance with an illustrative embodiment of the invention. Initially the secure router may set a security level for the secure router and an address for the secure route discovery node (step 701). These steps permit the secure router to later communicate with the secure route discovery node and inform the secure route discovery node of the security level of the secure router. The setting of the security level may be by way of a user interface used to elicit and obtain an entry from an authorized administrator the security level with which to associate the secure router.

Next, the secure router may set a routing table (step 703). Next, the secure router may transmit a multicast packet having the security level and the neighbor routers (step 705). The neighbor routers can include one or more neighbor secure routers. The neighbor secure router is a router reached by a single hop by the secure router. It is appreciated that the payload of security level and neighbor routers may be divided among several packets, as an alternative to step 705. Next, the secure router may receive a packet from a source address (step 707). The packet may have a label for a classification level. As such, the secure router may compare the packet to the security level of the secure router set at step 701. Thus, the secure router determines whether the packet classification level is above the secure router security level (step 709).

A positive determination at step 709 can cause the security router to transmit the source address to the secure route discovery node (step 721). A reason to report the source address in this manner is that it may be helpful to identify the node corresponding to the source address as a node that is ineffective at assuring packets dispatched from the node traverse only secure routers having clearance levels at or above the classification level of the packets so dispatched. Accordingly, the secure router may next drop the packet (step 723).

If, instead, the secure router makes a negative determination at step 709, the secure router may transmit the packet according to a strict source route internet protocol (step 711). Such a strict source route internet protocol can be established on the basis of a secure route determined by a trusted host in cooperation with a secure route discovery node, explained further below. Next, after either step 711 or step 723, the secure router may determine if the packet received at step 707 is the last packet (step 713). A positive determination causes the secure router to repeat step 707, and accordingly receive an additional packet. A negative determination at step 713 may cause termination.

Figure 8:
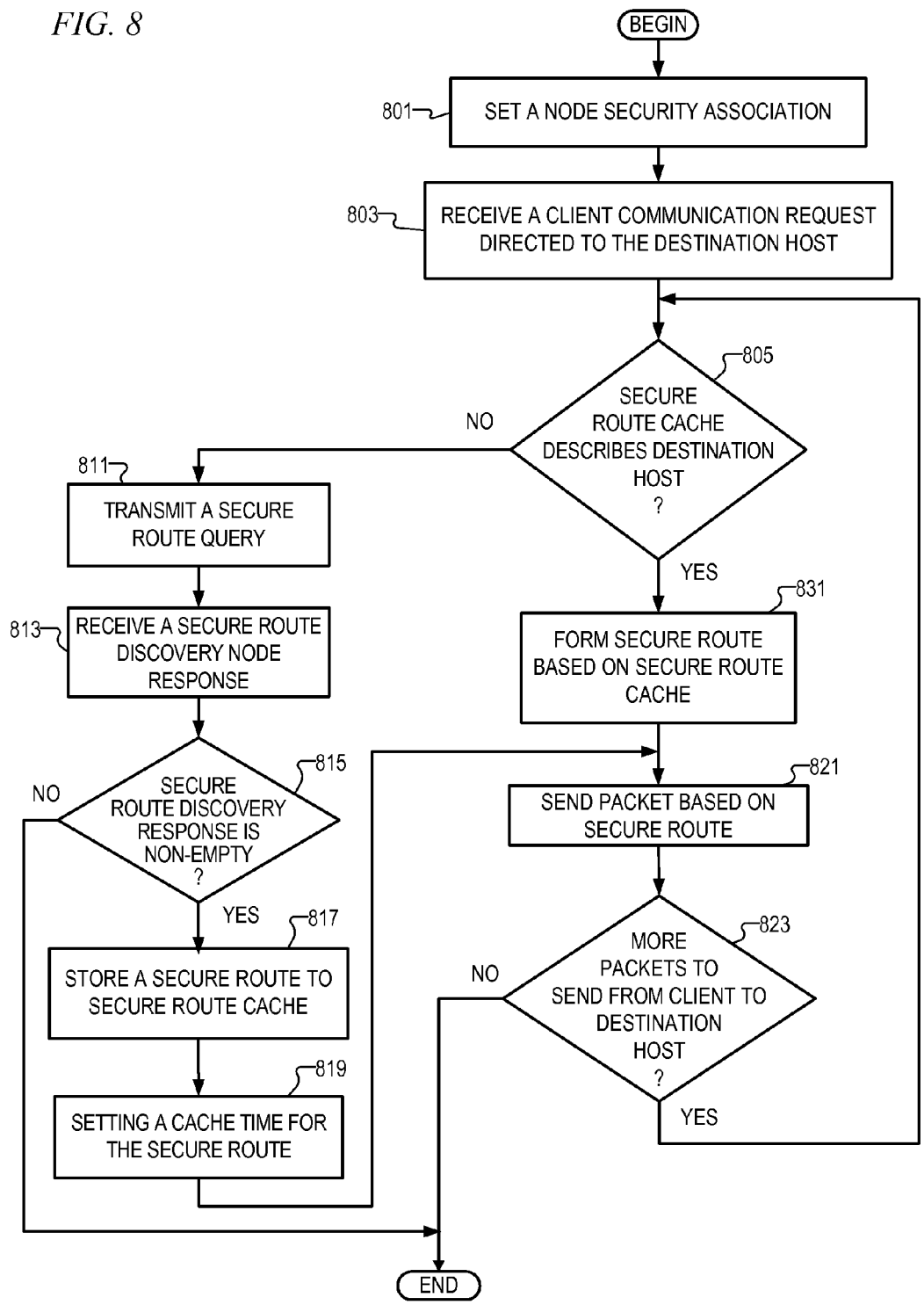
FIG. 8 is a flowchart of steps for a trusted host to take to set up a secure route in accordance with an illustrative embodiment of the invention.

FIG. 8 is a flowchart of steps for a trusted host to take to set up a secure route in accordance with an illustrative embodiment of the invention. Initially, the trusted host sets a node security association (step 801). A node security association can be a default classification level for packets transmitted from the trusted host. The node may provide a user interface, for which an authorized person acting as administrator, may edit one or more configuration files to store the node security association. It is appreciated that the configuration file may be any form of data structure suitable for storing configuration information on the node, for example, a database, a flat file, or the like. Accordingly, the configuration file may be stored wholly or in part in storage, memory, cache or any other electronic device for reference by processes executing on the node. Next, the trusted host may receive a client communication request directed to a destination host (step 803). In the example of network 200, of FIG. 2, trusted host 209 is the destination host by virtue of the communication request defining the trusted host as a destination host. A client communication request is a signal generated by a client or in response to a client where the client requests that information be transmitted in packets to a destination host. Accordingly, the client communication request may include, for example, a hypertext transport protocol that is directed to a destination host, as may be used by a browser. The client communication request may be for file transport protocol packets, simple mail transport protocol packets, lightweight directory access protocol packets, among others. The client communication request may specify a security classification. However, if the client communication request does not specify a security level, the node security association may be used as the security level.

Next, the trusted host may determine if a secure route cache describes the destination host (step 805). The step 805 may include matching a route to the security level, where the route includes the destination host. If the security level associated with the route is not at or above the security level determined at step 803, a negative determination may occur at step 805.

Accordingly, steps 811 through 819 may permit the trusted host to acquire a secure route when no secure route is discoverable within the secure route cache. The trusted host may transmit a secure route query (step 811). The step may be performed using the security level determined at step 803. Next, the trusted host may receive a secure route discovery node response (step 813). Next, the trusted host may determine if the secure route discovery node response is non-empty (step 815). The secure route discovery node response may be formed as described in relation to FIG. 6, above. Accordingly, a positive result to step 815 may result in the trusted host storing a secure route to a secure route cache (step 817). Next, the trusted host may set a cache time for the secure route (step 819). A typical cache time may be up to 60 seconds, and can be set by a tunable setting. The cache time may be set in the manner described with respect to FIG. 5, above. Alternatively, a negative result to step 815 may result in the process terminating. In other words, a non-empty response at step 815 may thwart the client from sending packets.

After setting a cache time at step 819, the trusted host may send a packet based on the secure route (step 821). The secure route may be as determined from the secure route cache, or as determined by other means, described below. In addition, for each packet sent, the trusted host may set a strict source route option. Next, the trusted host may determine whether more packets are available to send from the client to the destination host (step 823). If not, processing may terminate. However, if so, the trusted host may resume at step 805. Step 805 determines if the secure route cache has a suitable route.

An alternate result to step 805 is to determine that the secure route cache describes a destination host. Accordingly, having made an affirmative determination, the trusted host may form a secure route based on the secure route cache (step 831). Processing continues at step 821 described above.

The illustrative embodiments permit a government to establish a secure path between a trusted host and a destination host, or at least indicating to a destination host that a secure route is unknown to a secure route discovery node. In addition, any secure paths so provided, may expire in a timescale that can make the trusted host responsive to ad hoc revisions of the secure routes database, as might occur if a secure router becomes compromised and stripped of its associated clearance level. One or more illustrative embodiments may detect improperly routed packets, and respond accordingly.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to direct at least one secure router, the method comprising:
   receiving a secure route query from a trusted host, the secure route query comprising a trusted host address, a destination host address and a one classification level;
   looking up at least one path having as endpoints, the trusted host address and the destination host address, wherein the at least one path is an inadequate path to interconnect a trusted host corresponding to the trusted host address and a destination host corresponding to the destination host address via at least one secure router having clearance levels at or above the one classification level and failing to locate any adequate paths and, in response, a secure route discovery node transmitting a secure route discovery node response as a packet to the trusted host, the packet having an empty string, wherein the packet having the empty string is a packet that contains null data at a payload field of the packet.

* * * * *